May 12, 1925.
G. C. CARHART
SHIFTING ROD LOCK FOR TRANSMISSION GEARING
Filed June 15, 1923
1,537,584
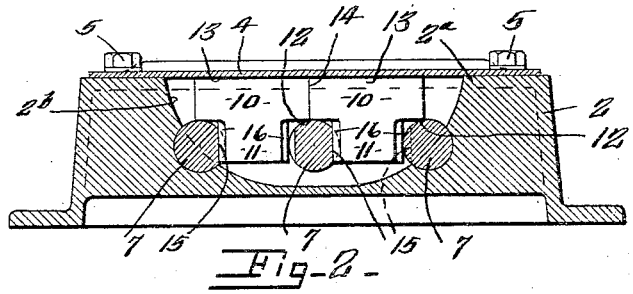
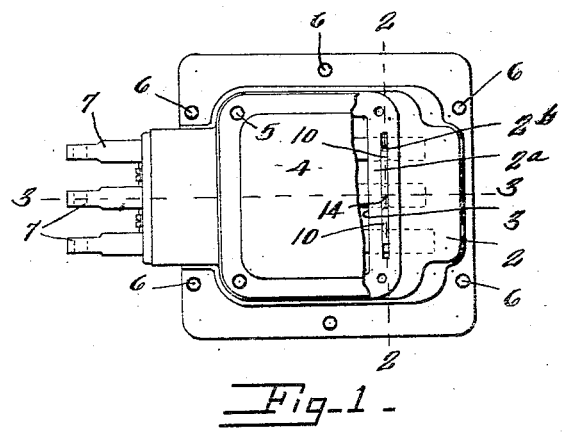
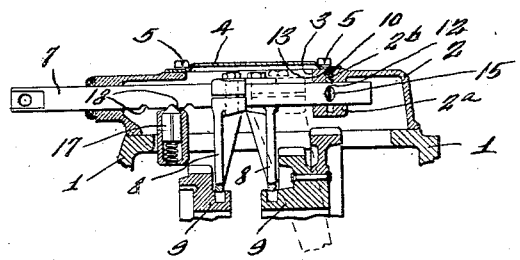
INVENTOR.
BY
ATTORNEYS.

Patented May 12, 1925.

1,537,584

UNITED STATES PATENT OFFICE.

GEORGE C. CARHART, OF SYRACUSE, NEW YORK, ASSIGNOR TO THE BROWN-LIPE GEAR COMPANY, OF SYRACUSE, NEW YORK, A CORPORATION OF NEW YORK.

SHIFTING-ROD LOCK FOR TRANSMISSION GEARING.

Application filed June 15, 1923. Serial No. 645,565.

*To all whom it may concern:*

Be it known that I, GEORGE C. CARHART, a citizen of the United States, and a resident of Syracuse, in the county of Onondaga and State of New York, have invented a certain new and useful Shifting-Rod Lock for Transmission Gearing, of which the following is a specification.

This invention relates to a variable speed transmission gearing, such as is used in motor vehicles and which includes a plurality of shifting rods, and has for its object a particularly simple and efficient locking means for holding the unshifted rods from movement while one of such rods is being shifted and is in its shifted position, and also a particularly simple and efficient arrangement of such locking means in the casing of the gearing. The invention consists in the novel features and in the combinations and constructions hereinafter set forth and claimed.

In describing this invention, reference is had to the accompanying drawing wherein like characters designate corresponding parts in all the views.

Figure 1 is a plan view of one form of gearing embodying my invention.

Figure 2 is a fragmentary sectional view taken on the plane of line 2—2, Figure 1.

Figure 3 is a large sectional view taken through the upper or secondary casing on the plane of line 3—3, Figure 1.

In so far as this invention is concerned, the transmission gearing comprises a casing in which the gearing is located, a plurality of shifter rods slidable in the casing, the casing being formed with a recess intersecting the passages for the rods, a lock means in the recess engaging the walls of the recess, the peripheries of the rods, and the cover for the open side of the recess whereby the locking means is held in position and guided in its movement by the rods, the walls of the recess and the cover thereof.

In the illustrated embodiment of my invention. the casing includes a main portion 1 and a secondary or cover portion 2 the portion 2 being formed with an opening 3 in its top which is normally closed by a cover 4, held in position in any suitable manner as by screws 5. The shifter rods are shown as carried by the secondary casing or cover portion 2 and as removable as a unit with the secondary casing. the secondary casing being secured to the main casing in any suitable manner as shown by screws 6.

7 designates the shifting rods there being here illustrated as three such rods arranged in parallelism and spaced equidistant apart with their axes in the same plane. As will be understood by those skilled in the art, the rods 7 are usually connected to a selecting and shifting lever. The rods 7 are slidable through the casing beneath the cover 4 and carry forks 8 which extend into the main casing and engage sliding gears 9 within the main casing in the usual manner. The secondary casing 2 is formed with a wall as $2^a$ extending transversely of the rods and formed with a narrow recess $2^b$ intersecting the passages for the rods and also opening through the upper edge of said wall or the upper face of the casing 2 in position to be covered by the margin of the cover 4.

The locking means here illustrated consist of a sliding bolt for each two rods 7, this bolt slidably engaging the peripheries of the rods, the opposing faces of the recess and the inner face of the margin of the cover 4 closing such recess. As there are three rods in the illustrated embodiment of my invention. there are two sliding bolts which abut against each other over the central rod, so that a sliding impulse imparted to either member is transferred to the other member.

As here illustrated, each sliding member or bolt 10 is in the form of a T shaped plate, the head of which on opposing sides of the leg or tongue 11, slidably engages at 12 with the peripheries of the rods and the outer edge of which engages at 13 with the inner face of the margin of the cover 4. The opposing ends of the heads of adjacent locking members of bolts 10 abut against each other at 14 over the middle shifting rod.

The rods on their opposing sides are formed with notches 15 and the leg or tongue 11 of each locking member 10 is of greater width than the distance between two of the rods but of less width than such distance plus the depth of one of the notches 15. These notches are formed with bevel sides, that is, they are substantially V shaped and the edges 16 of the tongue 11 are complemental to the notches. The notches of the rods are arranged in transverse alinement when all the rods are in neutral position. The arrangement of the locking members and the rods in such that, upon shifting of any one rod from neutral, the inclined or beveled face of its notch 15, acting upon the leg or tongue 11, shifts the locking member 10 out of such notch and into the notch of the next rod, thus locking the next rod from shifting movement and the locking member or bolt 10 so shifted thrusts against the next locking member, so that it shifts into locking engagement with the third shifting rod. The middle rod coacts with two locking members and when shifted, shifts both locking members apart into engagement with the two outer shifting rods.

In addition to the locking means just described, the gearing may be provided with the usual spring pressed poppets 17 engaging notches 18 in the rods.

This locking means and the arrangement thereof in the casing are particularly advantageous in that said means consists of but a few parts which are easily accessible, and the holder and guide for said means is formed by merely forming a slot which intersects the passage for the rods.

What I claim is:

1. In a transmission gearing, the combination of a casing having a wall of substantially equal thickness throughout, said wall being exposed at one edge and formed with a slot like recess opening through such edge, a plurality of shifting rods movable through said wall and said slot like recess and locking means located in the recess and operable by any one of the rods during the shifting thereof from neutral to lock the other rod from shifting movement and a cover closing the open side of the recess.

2. In a transmission gearing, the combination of a casing having a wall of substantially equal thickness throughout, the casing being open at one side and said wall being formed with a slot like recess opening through the edge exposed at the open side of the casing, a plurality of shifting rods movable through the wall and said slot like recess and locking means located in the recess and operable by any one of the rods during the shifting thereof from neutral to lock the other rod from shifting movement and a cover for the open side of the casing, said cover engaging the edge of said wall and closing the slot like recess.

3. In a transmission gearing, the combination of a casing having a wall of substantially equal thickness throughout, the casing being open at one side and said wall being formed with a slot like recess opening through the edge exposed at the open side of the casing, a plurality of shifting rods movable through the wall and said slot like recess and locking means located in the recess and operable by any one of the rods during the shifting thereof from neutral to lock the other rod from shifting movement and a cover for the open side of the casing, said cover engaging the edge of said wall and closing the slot like recess, such cover coacting with the locking means to guide such means during its movement.

4. In a transmission gearing, the combination of a casing having an open side and a cover for the open side, shifter rods movable in the casing beneath the cover and through a wall of the cover, said wall being formed with a recess intersecting the passages for the rods and opening through the outer face of such wall, the cover normally overlying the open side of the recess, and locking means located in the recess and operable by any one of the rods during the shifting thereof to lock the other rod for movement.

5. In a transmission gearing, the combination of a casing having an open side and a cover for the open side, shifter rods movable in the casing beneath the cover and through a wall of the cover, said wall being formed with a recess intersecting the passages for the rods and opening through the outer face of such wall, the cover normally overlying the open side of the recess and locking means located in the recess and operable by any one of the rods during the shifting thereof to lock the other rod for movement, the cover coacting with the locking means to guide said means in its movement.

6. In a transmission gearing, a main casing open at one side, a secondary casing mounted on the main casing, a plurality of shifting rods slidable in the secondary casing, the secondary casing being formed with an open top and with a wall of substantially equal thickness throughout, such wall being formed with passages for the rods and with a slot like recess intersecting the passages and opening through the exposed edge of such wall, a cover for the open top of the secondary casing the cover also closing said recess and locking means located in the recess and operable by any one of the rods during the shifting thereof to lock the other rod from movement.

7. In a transmission gearing, a casing, shifter rods slidable through a wall of the casing, such wall being formed with a recess intersecting the passages for the rods, the recess being open at one side, a sliding locking bolt having a tongue extended between two of the rods and a head spanning the rods and slidable transversely on such rods, such bolt being operable by the shifting of one rod to carry the tongue out of interlocking engagement with such rod into interlocking engagement with the next rod, a cover for the open side of the recess the inner face of the cover coacting with the head to hold the head on the rods and guide the bolt in its shifting movement.

8. In a transmission gearing, a casing, a plurality of shifter rods slidable in the casing, the casing having a wall formed with passages for the rods, such wall being formed with a recess intersecting such passages, the recess opening through an outer face of the casing, a locking member in the recess and slidably engaging the opposing walls of the recess and the peripheries of the rods, said member also having a part extending between the rods and operable to interlock therewith and to be shifted out of interlocking engagement with one rod during the shifting thereof and into interlocking engagement with the other rod.

9. In a transmission gearing, a casing, a plurality of shifter rods slidable in the casing, the casing having a wall formed with passages for the rods, such wall being formed with a recess intersecting such passages, the recess opening through an outer face of the casing, a locking member in the recess and slidably engaging the opposing walls of the recess and the peripheries of the rods, said member also having a part extending between the rods and operable to interlock therewith and to be shifted out of interlocking engagement with one rod during the shifting thereof and into interlocking engagement with the other rod, and a cover for the open side of the recess engaging the outer edge of the locking member.

10. In a transmission gearing, a casing formed having an open top, a cover for the open top, shifter rods slidable in the casing below the cover, the casing having a wall formed with passages for the rods and such wall being formed with a recess extending transversely of and intersecting such passages, the recess opening through the top of the casing adjacent the cover and in position to be closed by the margin of the cover, and a T shaped locking member slidably engaging the opposing walls of the recess, the leg of the T extending between the rods and interlocking with one of the rods to prevent shifting thereof and coacting with such rods whereby the shifting of one of the rods shifts said member out of interlocking engagement with such rod being shifted into interlocking engagement with the other rod, the edges of the head of the T on the opposite sides of the leg slidably engaging the periphery of the rod and the upper edge of the head slidably engaging the cover.

11. In a transmission gearing, a casing having a wall formed with a recess therein, shifter rods slidable in the casing through said wall and through the recess, a T shaped locking member slidably engaging the opposing walls of the recess, the leg of the T extending between the rods and interlocking with one of the rods to prevent shifting thereof and coacting with such rods, so that the shifting of one of the rods, shifts said member out of interlocking engagement therewith and into interlocking engagement with the other rod, the edges of the head of the T on opposite sides of the leg slidably engaging the periphery of the rods.

12. In a transmission gearing, a casing having a wall formed with a recess therein opening through an edge of said wall, shifter rods slidable in the casing through said wall and through the recess, a T shaped locking member slidably engaging the opposing walls of the recess, the leg of the T extending between the rods and interlocking with one of the rods to prevent shifting thereof and coacting with such rods, so that the shifting of one of the rods shifts said member out of interlocking engagement therewith and into interlocking engagement with the other rod, the edges of the head of the T on opposite sides of the leg slidably engaging the periphery of the rods, and a cover for the recess with which the upper edge of the head of the T slidably engages.

13. In a transmission gearing, a casing, one of the walls of the casing being formed with a recess, three shifter rods slidable in the casing and through the recess, T shaped locking members slidably engaging the opposing walls of the recess, the heads of the T's abutting against each other and the legs of the T's extending between the rods and interlocking with the rods to prevent shifting thereof and coacting with such rods so that the shifting of any one of the rods shifts said members into interlocking engagement with the other rods, the edges of the heads of the T's on opposite sides of the legs slidably engaging the peripheries of the rods.

14. In a transmission gearing, a casing, one of the walls of the casing being formed with a recess open at one side, three shifter rods slidable in the casing and through the recess, T shaped locking members slidably engaging the opposing walls of the recess, the heads of the T's abutting against each other and the legs of the T's extending between the rods and interlocking with the rods to prevent shifting thereof and coacting with such rods so that the shifting of any one of the rods shifts said members into interlocking engagement with the other rods, the edges of the heads of the T's on opposite sides of the leg slidably engaging the peripheries of the rods, and a cover for the open side of the recess slidably engaging the heads of the T's.

In testimony whereof, I have hereunto signed my name, at Syracuse, in the county of Onondaga, and State of New York, this 8th day of June, 1923.

GEORGE C. CARHART.